United States Patent
Error et al.

(10) Patent No.: US 7,441,195 B2
(45) Date of Patent: Oct. 21, 2008

(54) ASSOCIATING WEBSITE CLICKS WITH LINKS ON A WEB PAGE

(75) Inventors: Brett M. Error, Orem, UT (US); Christopher Reid Error, Orem, UT (US); Richard Zinn, Saratoga Springs, UT (US)

(73) Assignee: Omniture, Inc., Orem, UT (US)

( * ) Notice: Subject to any disclaimer, the term of this patent is extended or adjusted under 35 U.S.C. 154(b) by 719 days.

(21) Appl. No.: 10/794,809

(22) Filed: Mar. 3, 2004

(65) Prior Publication Data

US 2004/0254942 A1 Dec. 16, 2004

Related U.S. Application Data

(60) Provisional application No. 60/452,084, filed on Mar. 4, 2003, provisional application No. 60/452,085, filed on Mar. 4, 2003.

(51) Int. Cl.
*G06F 3/00* (2006.01)
(52) U.S. Cl. .................................. 715/738; 715/229
(58) Field of Classification Search ................. 715/700, 715/229, 738
See application file for complete search history.

(56) References Cited

U.S. PATENT DOCUMENTS

| | | | |
|---|---|---|---|
| 5,760,772 A | 6/1998 | Austin | |
| 5,796,402 A | 8/1998 | Ellison-Taylor | |
| 5,821,931 A | 10/1998 | Berquist et al. | |
| 5,835,087 A | 11/1998 | Herz et al. | |
| 5,870,559 A | 2/1999 | Leshem et al. | |
| 5,892,917 A * | 4/1999 | Myerson | 709/224 |
| 5,946,681 A * | 8/1999 | Shorter | 707/3 |
| 5,966,139 A | 10/1999 | Anupam et al. | |
| 5,991,773 A * | 11/1999 | Tagawa | 707/203 |
| 6,008,809 A | 12/1999 | Brooks | |
| 6,026,397 A | 2/2000 | Sheppard | |
| 6,112,240 A * | 8/2000 | Pogue et al. | 709/224 |
| 6,138,121 A * | 10/2000 | Costa et al. | 707/100 |
| 6,182,097 B1 | 1/2001 | Hansen et al. | |
| 6,188,405 B1 | 2/2001 | Czerwinski et al. | |

(Continued)

FOREIGN PATENT DOCUMENTS

WO   WO 00/58866 A   10/2000

(Continued)

OTHER PUBLICATIONS

U.S. Appl. No. 10/113,808, filed Mar. 29, 2002, Wiles Jr.

(Continued)

*Primary Examiner*—Ba Huynh
*Assistant Examiner*—Eric Wiener
(74) *Attorney, Agent, or Firm*—Raubvogel Law Office

(57) ABSTRACT

Objects on a web page are associated with stored records indicating historical object usage. Associations between objects and records take into account discrepancies in object identifiers resulting from authorial edits and/or differences in browser assignment of object identifiers. An object having an object identifier that differs from that of a stored record by not more than a predetermined tolerance value, and that has other indicia that match the stored record, is considered to match the stored record. Reports are generated quantifying web page object usage, for example by superimposing color shadings or other visual indicia on a representation of a web page.

27 Claims, 4 Drawing Sheets

U.S. PATENT DOCUMENTS

| | | | |
|---|---|---|---|
| 6,266,649 B1 | 7/2001 | Linden et al. | |
| 6,310,631 B1 | 10/2001 | Cecco et al. | |
| 6,393,479 B1 | 5/2002 | Glommen et al. | |
| 6,414,677 B1 | 7/2002 | Robertson et al. | |
| 6,473,102 B1 | 10/2002 | Rodden et al. | |
| 6,489,968 B1 | 12/2002 | Ortega et al. | |
| 6,584,504 B1 * | 6/2003 | Choe | 709/224 |
| 6,654,036 B1 | 11/2003 | Jones | |
| 6,671,711 B1 | 12/2003 | Pirolli et al. | |
| 6,704,016 B1 | 3/2004 | Oliver et al. | |
| 6,754,873 B1 | 6/2004 | Law et al. | |
| 6,766,370 B2 | 7/2004 | Glommen et al. | |
| 6,802,447 B2 * | 10/2004 | Horng | 235/375 |
| 6,850,988 B1 | 2/2005 | Reed | |
| 6,862,574 B1 | 3/2005 | Srikant et al. | |
| 6,915,482 B2 * | 7/2005 | Jellum et al. | 715/234 |
| 6,950,993 B2 | 9/2005 | Breinberg | |
| 6,963,874 B2 | 11/2005 | Kasriel et al. | |
| 6,968,511 B1 | 11/2005 | Robertson et al. | |
| 6,973,492 B2 * | 12/2005 | Streble | 709/224 |
| 6,980,962 B1 | 12/2005 | Arganbright et al. | |
| 6,981,017 B1 * | 12/2005 | Kasriel et al. | 709/203 |
| 7,016,892 B1 * | 3/2006 | Kokkonen et al. | 707/3 |
| 7,085,682 B1 * | 8/2006 | Heller et al. | 702/186 |
| 7,107,535 B2 * | 9/2006 | Cohen et al. | 715/736 |
| 7,225,407 B2 * | 5/2007 | Sommerer et al. | 715/738 |
| 2002/0040395 A1 | 4/2002 | Davis et al. | |
| 2002/0042750 A1 | 4/2002 | Morrison | |
| 2002/0087621 A1 | 7/2002 | Hendriks | |
| 2002/0087679 A1 * | 7/2002 | Pulley et al. | 709/224 |
| 2002/0091591 A1 | 7/2002 | Tsumura et al. | |
| 2002/0093529 A1 | 7/2002 | Daoud et al. | |
| 2002/0099812 A1 | 7/2002 | Davis et al. | |
| 2002/0147805 A1 * | 10/2002 | Leshem et al. | 709/223 |
| 2002/0152284 A1 | 10/2002 | Cambray et al. | |
| 2002/0165936 A1 | 11/2002 | Alston et al. | |
| 2002/0186253 A1 | 12/2002 | Rodden et al. | |
| 2002/0188237 A1 | 12/2002 | Bradley et al. | |
| 2002/0198939 A1 | 12/2002 | Lee et al. | |
| 2003/0023712 A1 | 1/2003 | Zhao et al. | |
| 2003/0025737 A1 | 2/2003 | Breinberg | |
| 2003/0055883 A1 | 3/2003 | Wiles, Jr. | |
| 2003/0101415 A1 * | 5/2003 | Chang | 715/513 |
| 2003/0115333 A1 * | 6/2003 | Cohen et al. | 709/227 |
| 2003/0128231 A1 | 7/2003 | Kasriel et al. | |
| 2003/0128233 A1 * | 7/2003 | Kasriel | 345/738 |
| 2003/0131097 A1 | 7/2003 | Kasriel et al. | |
| 2003/0131106 A1 * | 7/2003 | Kasriel | 709/225 |
| 2004/0049417 A1 | 3/2004 | Nickerson et al. | |
| 2004/0133671 A1 | 7/2004 | Taniguchi | |
| 2004/0205157 A1 | 10/2004 | Bibelnieks et al. | |
| 2005/0044508 A1 | 2/2005 | Stockton | |
| 2005/0204307 A1 | 9/2005 | Nadal | |
| 2005/0229110 A1 | 10/2005 | Gegner et al. | |
| 2005/0235222 A1 | 10/2005 | Barbanson et al. | |
| 2005/0273727 A1 | 12/2005 | Barbanson et al. | |

FOREIGN PATENT DOCUMENTS

WO    WO 02/23438 A2    3/2002

OTHER PUBLICATIONS

U.S. Appl. No. 10/113,322, filed Mar. 29, 2002, Zhao et al.
U.S. Appl. No. 10/057,513, filed Jan. 25, 2002, Alston et al.
U.S. Appl. No. 09/835,112, filed Apr. 13, 2001, Cambray et al.
Hong, J. et al., "What Did They Do? Understanding Clickstreams with the WebQuilt Visualization System," WebQuilt homepage http://guir.berkeley.edu/projects/webquilt/, pp. 1-7.
Hong, J. et al., "WebQuilt: A Framework for Capturing and Visualizing the Web Experience," WebQuilt, homepage: http://guir.berkeley.edu/projects/webquilt/, May 1-5, 2001, pp. 1-8.
Supplementary European Search Report, EP 04717485, Nov. 7. 2006, 3 pages.
Notification of International Search Report and Written Opinion, PCT/US04/39253, Dec. 13, 2005, 13 pages.
Notification of International Search Report and Written Opinion, PCT/US04/06898, Feb. 9, 2005, 8 pages.
Notification of International Search Report and Written Opinion, PCT/US04/06696, Feb. 28, 2005, 9 pages.

* cited by examiner

FIG. 2

ASSOCIATING WEBSITE CLICKS WITH LINKS ON A WEB PAGE

RELATED APPLICATIONS

This application claims priority from U.S. Provisional Application Ser. No. 60/452,084, dated Mar. 4, 2003, entitled "Associating Website Clicks with Links on a Web Page,", the contents of which are incorporated by reference.

This application further claims priority from U.S. Provisional Application Ser. No. 60/452,085, dated Mar. 4, 2003, entitled "Delayed Data Collection Using Web Beacon-Based Tracking Methods,", the contents of which are incorporated by reference.

This application is related to U.S. patent application Ser. No. 10/608,515 entitled "Efficient Click-Stream Data Collection", filed Jun. 26, 2003; U.S. patent application Ser. No. 10/608,442 entitled "Custom Event and Attribute Generation for Use in Website Traffic Data Collection", filed Jun. 26, 2003; U.S. patent application Ser. No. 10/609,008 entitled "Capturing and Presenting Site Visitation Path Data", filed Jun. 27, 2003; and U.S. application Ser. No. 10/795,079 entitled "Delayed Transmission of Website Usage Data", filed on the same date as the present application. The contents of these related patent applications are incorporated herein by reference.

FIELD OF THE INVENTION

The present invention is related to tracking website usage, and more particularly to accurately identifying and associating objects activated by a user during the course of navigating a website.

DESCRIPTION OF THE BACKGROUND ART

In an on-line environment, website usage and other customer behavior may be tracked by a website server, or by another server such as a data collection server (also known as a data collector), which may be remotely located. The data collection server is notified of activity on a website so that it can monitor and track the activity. One method of achieving this notification is through the use of a request for embedded content.

Embedded content is part of a web page, such as an image, that is requested as a separate file from the file containing the web page. The separate file may be requested from the website server or from a remote server, such as a remote content server or data collection server. For example, when a user requests a web page from a website server, the website server sends the web page file to the user's client. The client, such as a web browser, then attempts to render the file as a viewable web page. However, upon rendering the web page file, the client may find a reference to a separate file located on the website server or a remote server. After the content is located and sent to the client, the client renders the separate file containing the embedded content along with the original web page.

A web beacon (also known as a web bug) is a particular type of embedded content where the content itself is irrelevant, but the request for content carries useful information. For example, a web beacon is often a transparent image having very small dimensions, such as 1 pixel by 1 pixel. This image is small enough to be invisible to the user. When a client is rendering a web page that includes a web beacon, the web beacon causes the client to send a resource request to a server such as a data collection server. The web beacon may include a script (or other code) that causes the client to include, in the resource request, additional information about the user and the user's environment. The additional information can include the data from a cookie, or other information about the client's operating environment or status. Where the server indicated by the web beacon code is a data collection server, the data collection server may, in response to the request, cause the client to set an additional cookie for identification for tracking purposes. In this manner, the web beacon request can be used to indicate to a data collection server that a particular web page is being rendered.

One method for including the request is to write the request as a static image tag in Hypertext Markup Language (HTML). The following is an example of an image tag in HTML:

```
<img src="http://ad.datacollectionserver.com/tracker.exe?AID=14658&PID=259294&banner=0.gif" width=1 height=1 border=0>
```

Here, the term "ad.datacollectionserver.com" refers to the address of the data collection server.

Another common method of including the request is to use a scripting language such as JavaScript so as to cause the browser to dynamically generate a request to the data collection server. One advantage of using a script instead of a static image tag is that the script can cause the browser to perform other functions including gathering additional data and sending it along with the request. In either case, the result is a request sent to the data collection server upon the occurrence of an event, such as the loading and rendering of a web page.

Once the request has been sent to the data collection server, the data collection server can perform various types of tracking functions. For example, the data collection server can count the number of requests associated with a web page so as to monitor traffic on the web page. By counting the number of times the web beacon element has been requested from the data collection server, the server can determine the number of times a particular page was viewed. By using JavaScript to dynamically construct the request for the web beacon and encode additional information, other identifying information can be obtained for further analysis.

Other types of website usage tracking are also well known, such as for example log file analysis. In such an approach, statistical analysis is performed on server logs in order to detect and analyze website traffic, and usage patterns.

In addition to tracking web page visits, it is often desirable to track user actions, such as object activations, on web pages. In general, existing approaches for collecting and tracking website usage fail to provide a means for tracking the actual links a user clicks on during the course of navigating a site. In some circumstances, the link clicked on can be inferred if the start page has only one link that leads to the destination page. However, where there is more than one link between pages, the determination of which link was clicked is more difficult or impossible. Additionally, even when there is only one link between two pages, it is often difficult or impossible to determine whether the user actually clicked on the link or navigated to the page via some other method (such as typing in the URL).

Such information is useful in many ways, including for example collecting feedback that leads to improved web page design; determining the effect of various degrees of prominence of links and graphic elements on web pages; and the like. What is needed, then, is a method and system for reliably and accurately tracking the actual links a user clicks on (and other objects the user activates) during the course of navigating a site. What is further needed is a mechanism for automatically and uniquely identifying links on a page so that the user's interactions with the links can be accurately tracked. What is further needed is a mechanism for accurately reporting web page object usage statistics. What is further needed is an improved report format that visually depicts web page object usage statistics.

SUMMARY OF THE INVENTION

According to the present invention, objects (such as links) on a web page are uniquely identified by virtue of Object ID (assigned to the element by some browsers as a part of the Document Object Model), as well as other identifying indicia, such as an element type descriptor and an action descriptor.

Using the combination of these indicia, the present invention allows a web tracking system to associate historical clicks on various objects of a web page with the objects currently being viewed in the browser. If an exact match is not found for an object, a search factor can be applied in order to account for slight variations in Object IDs; such variations are common, particularly when Object IDs are assigned by different browsers or on different platforms, or when a web page has been altered or edited. Accordingly, the present invention accounts for such differences and allows matches to be made even when Object IDs are not identical. In addition, if Object IDs are not present (for example, if the browser in use does not generate Object IDs), objects are matched using the other identifying indicia.

By identifying objects according to the techniques of the present invention, web behavior tracking systems can more accurately detect, record, and analyze user actions with respect to objects (such as links) on a web page. A report can then be generated, showing indications of relative popularity of various objects on a web page by superimposing visual indicators, such as color-coded shading, on a representation of the web page.

BRIEF DESCRIPTION OF THE DRAWINGS

FIG. 2 is a screen shot depicting an example of a page analysis report facilitated by the present invention.

The Figures depict a preferred embodiment of the present invention for purposes of illustration only. One skilled in the art will readily recognize from the following discussion that alternative embodiments of the structures and methods illustrated herein may be employed without departing from the principles of the invention described herein.

DESCRIPTION OF AN EMBODIMENT OF THE INVENTION

System Architecture

Figure 1:
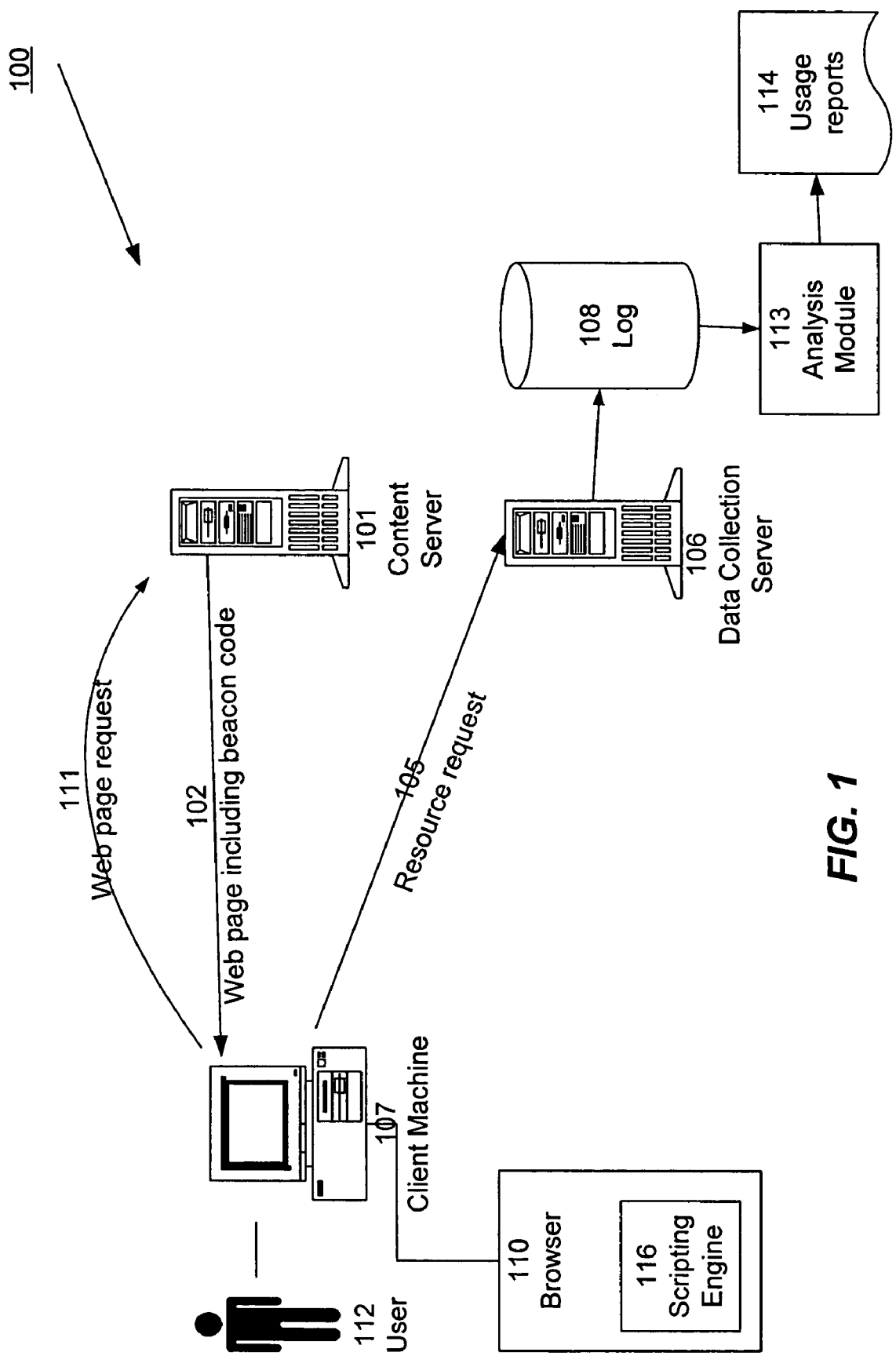
FIG. 1 is a block diagram depicting a system for website traffic data collection.

Referring now to FIG. 1, there is shown a block diagram depicting a system for website traffic data collection according to one embodiment of the present invention. User 112 interacts with client machine 107, which runs a software application such as browser 110 for accessing and displaying web pages. Client machine 107 may be an ordinary personal computer, including well-known components such as a CPU running an operating system such as Microsoft Windows, a keyboard, mouse, display screen, and Internet connection (not shown). Client machine 107 may run various software applications in addition to browser 110. Browser 110 includes scripting engine 116, such as JavaScript, as is commonly found in commercially available browsers. In response to a user 112 action such as clicking on a link or typing in a URL, client machine 107 issues a web page request 111 that is transmitted via the Internet to content server 101. In response to request 111, content server 101 transmits web page 102 (in the form of HTML code, for example) to client machine 107. Browser 110 displays the requested web page 102 on client machine 107.

Web page 102 includes beacon code, which in one embodiment is a pointer to a beacon (such as a 1 pixel by 1 pixel transparent image). The beacon is typically invisible to the user, such as a transparent one-pixel image. For purposes of the following description, a beacon is any element that is embedded in a web page 102 which is loaded automatically by browser 110 that references an external server 106 and is used to monitor traffic. The beacon code can be provided as a script (such as a JavaScript script) to be executed by scripting engine 116. The beacon code causes client machine 107 to generate resource requests 105 to data collection server 106. These resource requests 105 are usually dynamically generated according to the script instructions. Data collection server 106 records such requests in a log 108, and can also record additional information associated with the request (such as the date and time, and possibly some identifying information that may be encoded in the resource request). Thus, tracking server 106 records the occurrence of a "hit" to web page 102. Tracking server 106 also transmits the requested one-pixel image to client machine 107 so that the resource request is satisfied.

Analysis module 113 retrieves stored tracking data from log 108, filters the data, and outputs reports 114. Reports 114 may be provided in hard copy, or via a display screen (not shown), or by some other means. Reports 114 include, for example, overviews and statistical analyses describing the relative frequency with which various site paths are being followed through the website. Examples of such reports are described below.

Module 113 may be implemented in software running on server 106 or on another computer that can access log 108.

In one embodiment, communications between client machine 107, content server 101, and data collection server 106 are accomplished using well known network protocols, such as TCP/IP and HTTP, for communication across the Internet. Other communication methodologies and protocols can also be used.

Method

In the following description, the invention is set forth in the context of identifying user-activated objects on a web page; however, one skilled in the art will recognize that the techniques described herein can be used in any context where it is desirable to determine a match between a web page object and stored records.

In one embodiment, the present invention is implemented using a client-side script encoded in the beacon code that is sent as part of web page 102. This script iterates through the Document Object Model (DOM) of the web page 102, looking for actionable items such as HREF links and form submit buttons. The script overrides the default action of these links to include a call to a click-tracking function in addition to the executing the normally expected action.

The click-tracking function is called, for example, when the user 112 activates an HTML object on page 102 by clicking on it. This function sends to data collection server 106 a unique identifier of the page 102 where the object is found (such as a URL or unique page name), the action performed by the user-activated object, an OBJECT ID of the user-activated object, and a TYPE associated with the user-activated object.

In one embodiment, the action performed by the user-activated object is specified in terms of a target referenced by the object. The action of an HREF tag, for example, is the page pointed to by the tag. For a form submit button, the action is the document that the form will be submitted to, as defined in the <FORM> tag. Alternatively, the action can be specified as an ACTION parameter of a form, or alternatively a JavaScript function.

In one embodiment, the OBJECT ID is an identifier assigned to the object by browser 110 as a part of the Document Object Model (DOM). The OBJECT ID may be, for example, an integer sequentially assigned to each element as it is encountered by browser 110, according to techniques that are well known in the art.

In one embodiment, the TYPE is an indication of the type of object the user has activated. For example, it may be the TYPE parameter of an HTML element. The TYPE of the object may be, for example, an image, a form element, a standard HREF tag, a JavaScript element, or the like. By checking the TYPE of a link, the method of the present invention ensures, for example, that image and text links pointing to the same location can be easily distinguished from one another.

One skilled in the art will recognize that these information items are merely illustrative of the data sent to server 106 according to one embodiment, and that other information may be sent to server 106, including or omitting any of these and/or any other types of information describing the user-activated object.

Using the provided items of information, the present invention is able to detect matches between user-activated objects and stored records of previous activity such as historical clicks on various links in the page. According to the techniques of the present invention, matches can be found even if an exact OBJECT ID match may not exist. For any of a variety of reasons, an OBJECT ID as indicated in a stored record for an object may not exactly match a detected OBJECT ID for the same object when the user activates it. This OBJECT ID "drift" may occur, for example, when page content is changed (for example by a web author) and particularly when elements are added to or removed from a web page. Also, different browser models, and even different versions of the same browser, can assign OBJECT IDs slightly differently or may not assign OBJECT IDs at all. Accordingly, as described below, the present invention provides techniques for using other identifying indicia, such as TYPE and action, to more effectively match user-activated web page objects.

Figure 3:
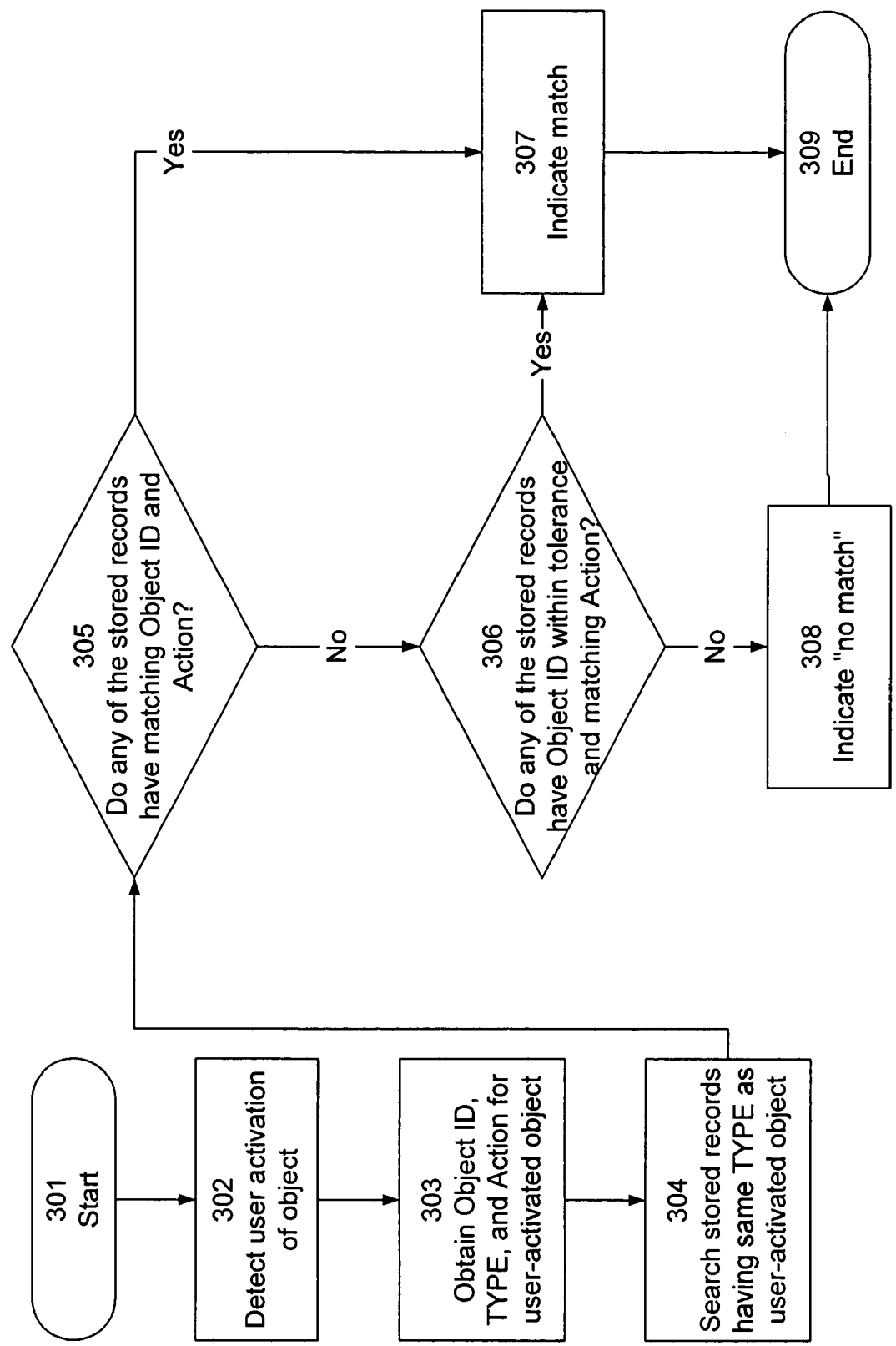
FIG. 3 is a flow diagram depicting a method of associating website clicks with links, according to an embodiment of the present invention.

Referring now to FIG. 3, there is shown a flow diagram illustrating a method of associating website clicks with links according to one embodiment. In one embodiment, the steps of FIG. 3 are performed by data collection server 106; in another embodiment, the steps may be performed by client machine 107 or by some other component of the system.

Server 106 detects 302 user activation of an object on web page 102, for example by receiving a request 105 or other message from client machine 107. Server 106 obtains 303, from the received request 105, information describing the user-activated object, including for example an OBJECT ID, a TYPE, and an action.

Server 106 then searches 304 stored records that have a TYPE that matches the TYPE of the user-activated object. In one embodiment, server 106 performs this search on records in log 108 or in some other repository of historical usage data. In one embodiment, server 106 searches 304 all stored records, without restricting the search to records having a matching TYPE.

If, in 305, any of the stored records have an OBJECT ID, Action and TYPE matching those of the user-activated object, server 106 indicates 307 that a match has been found.

If no match is found in 305, server 106 searches for stored records that have a matching Action and TYPE, and have an OBJECT ID that is close to the OBJECT ID of the user-activated object. In one embodiment, this search is performed iteratively using successively larger "search factors": First, a search is made for stored records having an OBJECT ID that differs by 1 or less from the user-activated object's OBJECT ID and having matching Action and TYPE. Then (assuming no match has yet been found), a search is made for stored records having an OBJECT ID that differs by 2 or less from the user-activated object's OBJECT ID and having matching Action and TYPE. This process is repeated with successively larger search factors until a match is found, or until the search factor exceeds a predetermined tolerance.

If, in 306, any matches are found, server 106 indicates 307 that a match has been found. Otherwise, server 106 indicates 308 that no match was found.

One skilled in the art will recognize that the method can be generalized by considering the comparison performed in 305 to be a special case of that performed in 306, but with a search factor of zero (in other words, the difference in OBJECT IDs must be zero for a match to be found in step 305).

One skilled in the art will further recognize that, in an alternative embodiment, the search is performed non-iteratively, so that any records having an OBJECT ID within the predetermined tolerance (and having matching action and TYPE) are considered potential matches. In one embodiment, server 106 identifies as a match the stored record(s) that, among potential matches, has (have) an OBJECT ID closest to that of the user-activated object.

In one embodiment, server 106 records the user action in log 108 according to whether a match was indicated. For example, if a match was indicated, server 106 increments a value in the matching record indicating the number of times the object was activated. If no match was indicated, server 106 creates a new record for the object.

Links may optionally be tagged with a unique "name". In this case, in one embodiment, neither the OBJECT ID nor the search factor is employed, but rather only the page name and link name are used to make the association.

If Object IDs are not present (for example, if browser 110 does not generate Object IDs), objects are matched using whatever identifying indicia are available, such as action and TYPE.

The values stored in log 108 can then be used to generate reports indicating statistics summarizing historical website usage. One example of a type of report that can be generated is a representation of a web page wherein visual indicators of usage are superimposed. For example, the report can depict links on a web page colored with different color densities and/or hues to indicate relative frequency with which the links have been activated.

In one embodiment, the steps of FIG. 3 are performed in response to individual user actions (such as web page clicks).

In another embodiment, the steps of FIG. 3 are performed after a number of user actions have taken place, rather than after each individual action. For example, data describing user actions can be stored locally at client machine 107 (using, for example, the techniques described in related U.S. application Ser. No. 10/795,079 entitled "Delayed Transmission of Website Usage Data", filed on the same date as the present application), and can be transmitted to server 106 when a new page is loaded or upon detection of some other triggering event. The object matching technique can thus be used to determine which stored record(s) match a number of user-activated objects or a number of user activations of a single object.

EXAMPLE

The techniques of the present invention are applicable in any situation where it is desirable to identify and associate a web page object, particularly where OBJECT IDs may not exactly match.

The following example depicts an embodiment of the invention where user interactions with a number of objects are being matched with objects on a web page. As described above, the method of the present invention can be performed in response to each individual user interaction, or after a series of user interactions has taken place.

Figure 4:
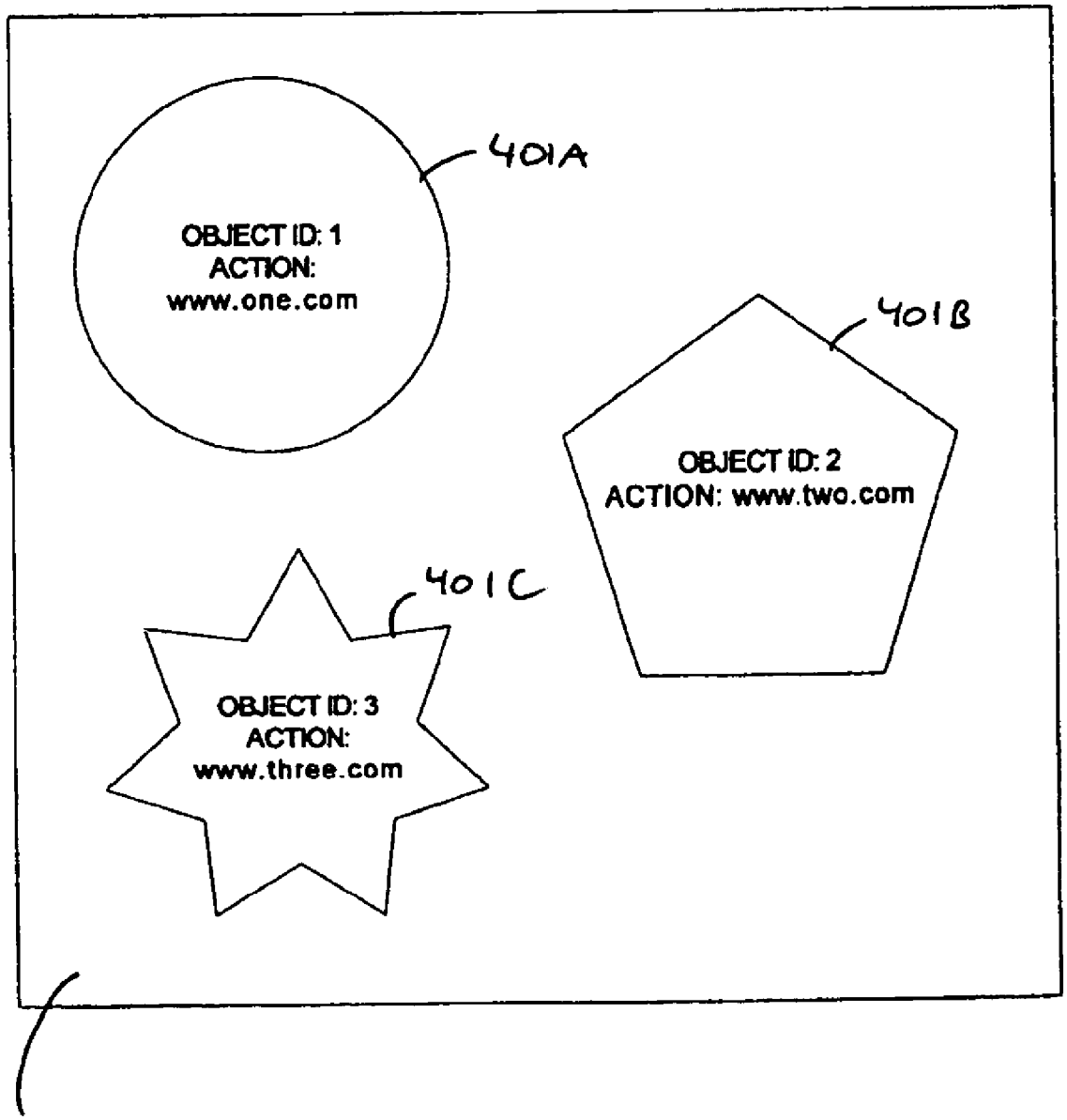
FIG. 4 is an example of a web page having objects to be associated with user actions.

Referring now to FIG. 4, there is shown an example of a web page 202 having three objects 401A, 401B, 401C. Object 401A has an OBJECT ID of 1 and an action of http://www.one.com. Object 401B has an OBJECT ID of 2 and an action of http://www.two.com. Object 401C has an OBJECT ID of 3 and an action of http://www.three.com. Web page 202 has a Page ID of "Page A".

The present invention provides a technique for matching the objects on page 202 with a record of user activity. For example, the invention can be used in response to an individual user action, in order to update stored data with current user activity.

Suppose, for example, that the following data is to be associated with the objects on page 202 as shown in FIG. 4. For illustrative purposes, all the objects have a TYPE of IMG (image).

| Page ID | OBJECT ID | Action | TYPE | # of Clicks |
|---|---|---|---|---|
| Page A | 1 | http://www.one.com | IMG | 2 |
| Page A | 2 | http://www.one.com | IMG | 3 |
| Page A | 3 | http://www.three.com | IMG | 8 |

In matching the indicated data with web page 202 as shown in FIG. 4, the following steps are performed:

For the first listed data item, determine whether any of the objects 401 have matching OBJECT ID (1), action (http://www.one.com), and TYPE (IMG). Object 401A satisfies these criteria; therefore object 401A is considered to match the first listed data item. Log 108 can thus be updated to indicate that object 401A has been activated twice.

For the second listed data item, determine whether any of the objects 401 have matching OBJECT ID (2), action (http://www.one.com), and TYPE (IMG). None of the objects 401 are an exact match; object 201B has matching OBJECT ID but does not match the action. Therefore, search for objects 401 having an OBJECT ID that are within a search factor of 1(in other words, objects 401 having an OBJECT ID of 1 or 3), and which match the action and TYPE listed above. Object 401A satisfies these criteria, having an OBJECT ID of 1, an action of http://www.one.com, and a TYPE of IMG. Log 108 can thus be updated to indicate that object 401A has been activated an additional three times.

For the third listed data item, determine whether any of the objects 401 have matching OBJECT ID (3), action (http://www.three.com), and TYPE (IMG). Object 401C satisfies these criteria; therefore object 401C is considered to match the first listed data item. Log 108 can thus be updated to indicate that object 401C has been activated eight times.

After the above steps, therefore, log 108 would indicate activity for objects 401A (five clicks) and 401C (eight clicks).

Output Format

Figure 2:
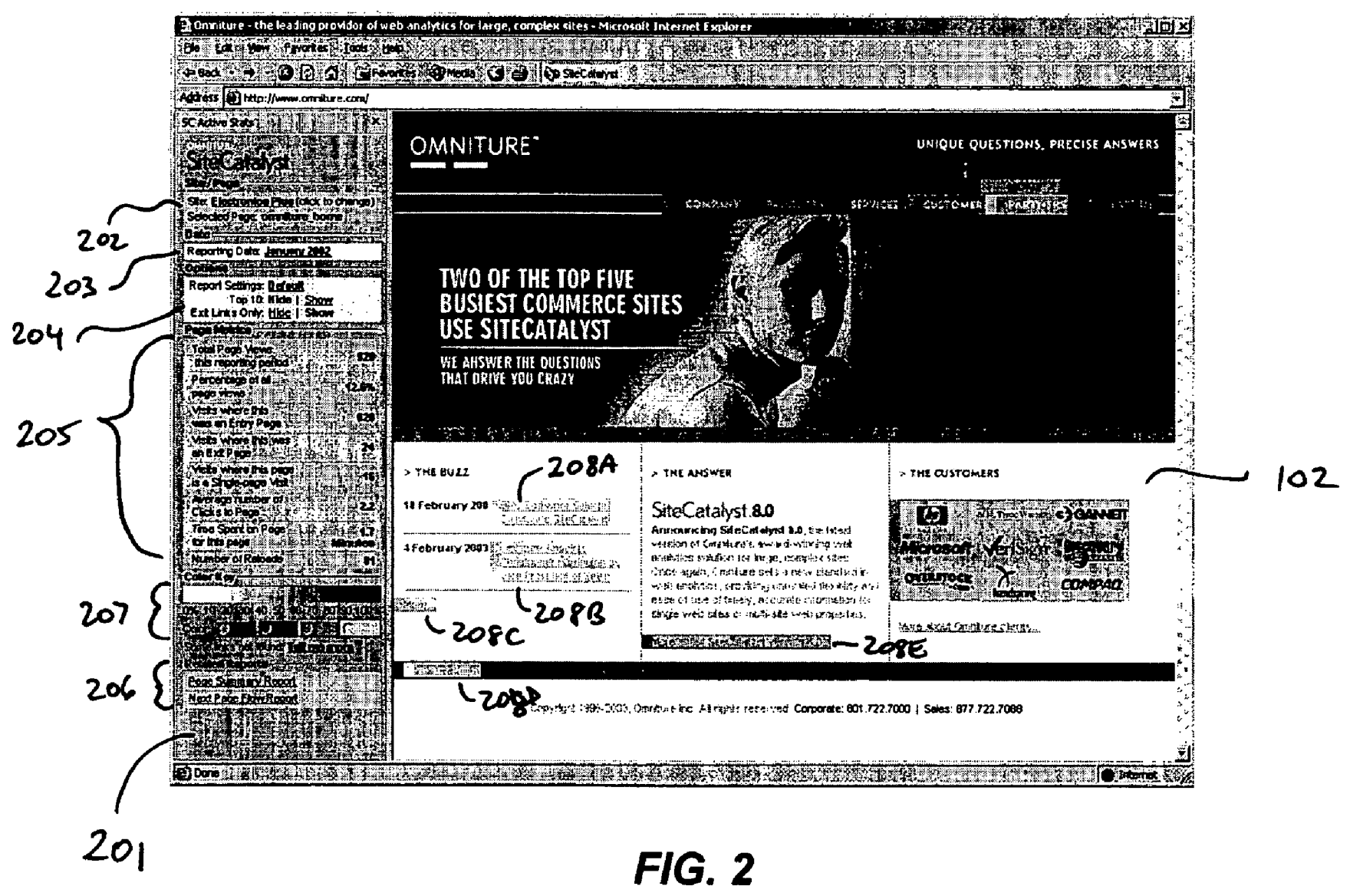

Referring now to FIG. 2, there is shown an example of a page analysis report 201, displayed alongside an image of the web page 102 being analyzed. In one embodiment, report 201 is provided to a site administrator or owner interacting with data collection server 106.

In the example of FIG. 2, report 201 includes identification 202 of the website and web page being analyzed; report date 203; report options and settings 204; page metrics 205; and links 206 to related reports. In addition, variable levels and shades of color density are superimposed on the displayed view of web page 102, in order to visually represent the relative number of clicks each item 208 or screen region has received. Color key 207 is a legend to indicate the meaning of various superimposed colors.

One skilled in the art will recognize that other formats and output mechanisms can be used, including for example hard copy output, text or graphical reports, and the like.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer, network of computers, or other apparatus. Various general-purpose systems may be used with programs in accordance with the teachings herein, or it may prove convenient to construct a more specialized apparatus to perform the required method steps. The required structure for a variety of these systems appears from the description. In addition, the present invention is not described with reference to any particular programming language. It will be appreciated that a variety of programming languages may be used to implement the teachings of the invention as described herein.

As will be understood by those familiar with the art, the invention may be embodied in other specific forms without departing from the spirit or essential characteristics thereof. For example, the particular architectures depicted above are merely exemplary of one implementation of the present invention. The functional elements and method steps described above are provided as illustrative examples of one technique for implementing the invention; one skilled in the art will recognize that many other implementations are possible without departing from the present invention as recited in the claims. Likewise, the particular capitalization or naming of the modules, protocols, features, attributes, or any other aspect is not mandatory or significant, and the mechanisms that implement the invention or its features may have different names or formats. In addition, the present invention may be implemented as a method, process, user interface, computer program product, system, apparatus, or any combination thereof. Accordingly, the disclosure of the present invention is intended to be illustrative, but not limiting, of the scope of the invention, which is set forth in the following claims.

What is claimed is:

1. A method of identifying which of a plurality of user-activatable objects on a web page has been activated by a user, comprising:
   receiving a communication indicating user activation of an object in a plurality of objects on a web page, the communication comprising an object identifier and additional identifying indicia for the object, wherein the additional identifying indicia comprises at least one of an action and a type;
   comparing the object identifier and the additional identifying indicia of the user-activated object with records comprising object identifiers and additional identifying indicia; and
   responsive to the object identifier of the user-activated object being within a predetermined tolerance factor with respect to an object identifier of a stored record, and the identifier of the stored record having additional identifying indicia matching the additional identifying indicia of the user-activated object:
      indicating a match between the user-activated object and the stored record.

2. The method of claim 1, further comprising:
   responsive to the object identifier and additional identifying indicia of the user-activated object matching the object identifier and additional identifying indicia of a stored record:
      indicating a match between the user-activated object and the stored record.

3. The method of claim 1, further comprising generating a report including statistics for user-activated objects.

4. The method of claim 1, further comprising generating a report including a representation of the web page, and for superimposing visual indicators quantifying user activations for objects on the web page.

5. The method of claim 4, wherein the visual indicators are color-coded.

6. A method of identifying a user-activatable object among a plurality of user-activatable objects, the object having an object identifier and additional identifying indicia, comprising:
   comparing the object identifier and the additional identifying indicia of the user-activatable object with records comprising object identifiers and additional identifying indicia, wherein the additional identifying indicia comprises at least one of an action and a type;
   responsive to the object identifier of the user-activatable object being within a predetermined tolerance factor with respect to an object identifier of a stored record, and the identifier of the stored record having additional identifying indicia matching the additional identifying indicia of the user-activatable object:
      indicating a match between the user-activatable object and the stored record.

7. The method of claim 6, further comprising:
   responsive to the object identifier and additional identifying indicia of the user-activatable object matching the object identifier and additional identifying indicia of a stored record:
      indicating a match between the user-activatable object and the stored record.

8. The method of claim 6, wherein the user-activatable object is a component of a web page, the method further comprising generating a report including a representation of the web page, and for superimposing visual indicators thereon quantifying user activations for user-activatable objects on the web page.

9. The method of claim 8, wherein the visual indicators are color-coded.

10. A computer program product for identifying which of a plurality of user-activatable objects on a web page has been activated by a user, comprising:
    a computer-readable medium; and
    computer program code, encoded on the medium, for:
       receiving a communication indicating user activation of an object in a plurality of objects on a web page, the communication comprising an object identifier and additional identifying indicia for the object, wherein the additional identifying indicia comprises at least one of an action and a type;

comparing the object identifier and the additional identifying indicia of the user-activated object with records comprising object identifiers and additional identifying indicia; and responsive to the object identifier of the user-activated object being within a predetermined tolerance factor with respect to an object identifier of a stored record, and the identifier of the stored record having additional identifying indicia matching the additional identifying indicia of the user-activated object:

indicating a match between the user-activated object and the stored record.

11. The computer program product of claim 10, further comprising computer program code, encoded on the medium, for:

responsive to the object identifier and additional identifying indicia of the user-activated object matching the object identifier and additional identifying indicia of a stored record:

indicating a match between the user-activated object and the stored record.

12. The computer program product of claim 10, further comprising computer program code, encoded on the medium, for generating a report including statistics for user-activated objects.

13. The computer program product of claim 10, further comprising computer program code, encoded on the medium, for generating a report including a representation of the web page, and for superimposing visual indicators quantifying user activations for objects on the web page.

14. The computer program product of claim 13, wherein the visual indicators are color-coded.

15. A computer program product of identifying a user-activatable object among a plurality of user-activatable objects, the object having an object identifier and additional identifying indicia, comprising:

a computer-readable medium; and computer program code, encoded on the medium, for:

comparing the object identifier and the additional identifying indicia of the user-activatable object with records comprising object identifiers and additional identifying indicia, wherein the additional identifying indicia comprises at least one of an action and a type;

responsive to the object identifier of the user-activatable object being within a predetermined tolerance factor with respect to an object identifier of a stored record, and the identifier of the stored record having additional identifying indicia matching the additional identifying indicia of the user-activatable object:

indicating a match between the user-activatable object and the stored record.

16. The computer program product of claim 15, further comprising computer program code, encoded on the medium, for:

responsive to the object identifier and additional identifying indicia of the user-activatable object matching the object identifier and additional identifying indicia of a stored record:

indicating a match between the user-activatable object and the stored record.

17. The computer program product of claim 15, wherein the user-activatable object is a component of a web page, the computer program product further comprising computer program code, encoded on the medium, for generating a report including a representation of the web page, and for superimposing visual indicators thereon quantifying user activations for user-activatable objects on the web page.

18. The computer program product of claim 17, wherein the visual indicators are color-coded.

19. A system for identifying which of a plurality of user-activatable objects on a web page has been activated by a user, comprising:

a communication device, for receiving a communication indicating user activation of an object in a plurality of objects on a web page, the communication comprising an object identifier and additional identifying indicia for the object, wherein the additional identifying indicia comprises at least one of an action and a type;

an object comparator, coupled to the communication device, for comparing the object identifier and the additional identifying indicia of the user-activated object with records comprising object identifiers and additional identifying indicia; and a match indicator, coupled to the object comparator, for, responsive to the object identifier of the user-activated object being within a predetermined tolerance factor with respect to an object identifier of a stored record, and the identifier of the stored record having additional identifying indicia matching the additional identifying indicia of the user-activated object:

indicating a match between the user-activated object and the stored record.

20. The system of claim 19, wherein:

responsive to the object identifier and additional identifying indicia of the user-activated object matching the object identifier and additional identifying indicia of a stored record, the match indicator indicates a match between the user-activated object and the stored record.

21. The system of claim 19, further comprising a report generator, for generating a report including statistics for user-activated objects.

22. The system of claim 19, further comprising a report generator, for generating a report including a representation of the web page, and for superimposing visual indicators quantifying user activations for objects on the web page.

23. The system of claim 22, wherein the visual indicators are color-coded.

24. A system for identifying a user-activatable object among a plurality of user-activatable objects, the object having an object identifier and additional identifying indicia, comprising:

an object comparator, for comparing the object identifier and the additional identifying indicia of the user-activatable object with records comprising object identifiers and additional identifying indicia, wherein the additional identifying indicia comprises at least one of an action and a type;

a match indicator, coupled to the object comparator, for, responsive to the object identifier of the user-activatable object being within a predetermined tolerance factor with respect to an object identifier of a stored record, and the identifier of the stored record having additional identifying indicia matching the additional identifying indicia of the user-activatable object:

indicating a match between the user-activatable object and the stored record.

25. The system of claim 24, wherein:

responsive to the object identifier and additional identifying indicia of the user-activatable object matching the object identifier and additional identifying indicia of a stored record, the match indicator indicates a match between the user-activatable object and the stored record.

26. The system of claim 24, wherein the user-activatable object is a component of a web page, the system further comprising a report generator for generating a report including a representation of the web page, and for superimposing visual indicators thereon quantifying user activations for user-activatable objects on the web page.

27. The system of claim 26, wherein the visual indicators are color-coded.

* * * * *

UNITED STATES PATENT AND TRADEMARK OFFICE
CERTIFICATE OF CORRECTION

PATENT NO. : 7,441,195 B2
APPLICATION NO. : 10/794809
DATED : October 21, 2008
INVENTOR(S) : Brett M. Error, Christopher Reid Error and Richard Zinn It is certified that error appears in the above-identified patent and that said Letters Patent is hereby corrected as shown below:

In claim 1, at col. 9, line 66, delete "at least one of" and insert --both--.

In claim 1, at col. 10, line 12, after "the stored record", insert --; wherein the web page comprises a first user-activatable web page object for performing an action and a second user-activatable web page object for performing the same action, and wherein indicating a match comprises indicating a match between the first user-activatable web page object and the stored record without indicating a match between the second user-activatable web page object and the stored record--.

In claim 6, at col. 10, line 36, delete "at least one of" and insert --both--.

In claim 6, at col. 10, line 44, after "the stored record", insert --; wherein the plurality of user-activatable objects comprises a first user-activatable object for performing an action and a second user-activatable object for performing the same action, and wherein indicating a match comprises indicating a match between the first user-activatable object and the stored record without indicating a match between the second user-activatable object and the stored record--.

In claim 10, at col. 11, lines 2-3, delete "at least one of" and insert --both--.

In claim 10, at col. 11, line 15, after "the stored record", insert --; wherein the web page comprises a first user-activatable web page object for performing an action and a second user-activatable web page object for performing the same action, and wherein the computer program code for indicating a match comprises computer program code for indicating a match between the first user-activatable web page object and the stored record without indicating a match between the second user-activatable web page object and the stored record--.

In claim 15, at col. 11, line 46, delete "at least one of" and insert --both--.

In claim 15, at col. 11, line 54, after "the stored record", insert --; wherein the plurality of user-activatable objects comprises a first user-activatable object for performing an action and a second user-activatable object for performing the same action, and wherein the computer program code for indicating a match comprises computer program code for indicating a match between the first user-activatable object and the stored record without indicating a match between the second user-activatable object and the stored record--.

UNITED STATES PATENT AND TRADEMARK OFFICE
CERTIFICATE OF CORRECTION

PATENT NO. : 7,441,195 B2
APPLICATION NO. : 10/794809
DATED : October 21, 2008
INVENTOR(S) : Brett M. Error, Christopher Reid Error and Richard Zinn It is certified that error appears in the above-identified patent and that said Letters Patent is hereby corrected as shown below:

In claim 19, at col. 12, line 14, delete "at least one of" and insert --both--.

In claim 19, at col. 12, line 28, after "the stored record", insert --; wherein the web page comprises a first user-activatable web page object for performing an action and a second user-activatable web page object for performing the same action, and wherein the match indicator indicates a match between the user-actived object and the stored record by indicating a match between the first user-activatable web page object and the stored record without indicating a match between the second user-activatable web page object and the stored record--.

In claim 24, at col. 12, line 53, delete "at least one of" and insert --both--.

In claim 24, at col. 12, line 63, after "the stored record", insert --; wherein the plurality of user-activatable objects comprises a first user-activatable object for performing an action and a second user-activatable object for performing the same action, and wherein the match indicator indicates a match between the user-activated object and the stored record by indicating a match between the first user-activatable object and the stored record without indicating a match between the second user-activatable object and the stored record--.

Signed and Sealed this

Sixteenth Day of December, 2008

JON W. DUDAS
*Director of the United States Patent and Trademark Office*